United States Patent
Takasu et al.

(10) Patent No.: US 9,651,779 B2
(45) Date of Patent: May 16, 2017

(54) HEAD-UP DISPLAY DEVICE AND DISPLAY UNIT

(71) Applicant: YAZAKI CORPORATION, Tokyo (JP)

(72) Inventors: Katsutoshi Takasu, Shizuoka (JP); Akira Masuda, Shizuoka (JP); Takeshi Iwamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/326,111

(22) Filed: Jul. 8, 2014

(65) Prior Publication Data

US 2015/0015457 A1 Jan. 15, 2015

(30) Foreign Application Priority Data

Jul. 10, 2013 (JP) ................. 2013-144887

(51) Int. Cl.
*G02B 27/01* (2006.01)
*G09G 3/34* (2006.01)
(Continued)

(52) U.S. Cl.
CPC .......... *G02B 27/0101* (2013.01); *B60K 37/02* (2013.01); *G02B 27/01* (2013.01);
(Continued)

(58) Field of Classification Search
CPC ............... G02B 27/0101; G02B 27/01; G02B 2027/014; G02B 2027/0141; G02B 6/00;
(Continued)

(56) References Cited

U.S. PATENT DOCUMENTS 5,136,516 A * 8/1992 Twombly ............... B61C 17/04
246/1 C
6,072,391 A * 6/2000 Suzuki ................... B60K 35/00
340/435
(Continued)

FOREIGN PATENT DOCUMENTS

JP 2002-163643 A 6/2002
JP 2006-11122 A 1/2006
(Continued)

OTHER PUBLICATIONS

Japanese Office Action for the related Japanese Patent Application No. 2013-144887 dated Feb. 21, 2017.
(Continued)

*Primary Examiner* — Gerald Johnson
*Assistant Examiner* — Darlene M Ritchie
(74) *Attorney, Agent, or Firm* — Kenealy Vaidya LLP

(57) ABSTRACT

A pair of first guide lights are displayed side by side adjacent to an HUD display area with emitted light from first light sources, and a pair of second guide lights are displayed at the outer sides of the respective first guide lights with emitted light from second light sources. At least one of the number of lighting lights, the lighting cycle, and the lighting order of the first light sources and the second light sources is changed in accordance with a differential value between the current speed and a speed limit set for a road on which the vehicle is traveling.

11 Claims, 12 Drawing Sheets

(51) Int. Cl.
  *G09G 3/36* (2006.01)
  *B60K 37/02* (2006.01)
  *F21V 8/00* (2006.01)
  *B60Q 3/10* (2017.01)

(52) U.S. Cl.
  CPC ............. *G09G 3/3406* (2013.01); *G09G 3/36* (2013.01); *B60Q 3/10* (2017.02); *G02B 6/0045* (2013.01); *G02B 6/0076* (2013.01); *G02B 2027/014* (2013.01); *G02B 2027/0141* (2013.01); *G09G 2380/10* (2013.01)

(58) Field of Classification Search
  CPC ...... G02B 6/0001; G09G 3/3406; G09G 3/36; B60K 37/02; B62D 1/046; B62D 1/06; B60Q 1/2665; B60Q 1/50; G02F 1/1335
  See application file for complete search history.

(56) References Cited

U.S. PATENT DOCUMENTS

| | | | |
|---|---|---|---|
| 6,859,147 B2* | 2/2005 | Buscemi | 340/902 |
| 7,679,495 B2* | 3/2010 | Beutnagel-Buchner | B62D 1/046 116/31 |
| 2002/0003571 A1* | 1/2002 | Schofield et al. | 348/148 |
| 2003/0214724 A1* | 11/2003 | Fujikawa | G02B 27/0101 359/630 |
| 2005/0062597 A1* | 3/2005 | Su | B60Q 1/2665 340/475 |
| 2006/0164230 A1* | 7/2006 | DeWind | B60K 35/00 340/461 |
| 2008/0211779 A1* | 9/2008 | Pryor | 345/173 |
| 2010/0245711 A1* | 9/2010 | Kubota | G02F 1/133603 349/61 |
| 2010/0321170 A1* | 12/2010 | Cooper et al. | 340/425.5 |
| 2011/0161004 A1* | 6/2011 | Chao | G01C 21/3697 701/408 |
| 2012/0008063 A1* | 1/2012 | Asamizu | G02F 1/133611 349/61 |
| 2012/0075708 A1* | 3/2012 | Hagiwara et al. | 359/630 |
| 2012/0256812 A1 | 10/2012 | Aoki et al. | |
| 2013/0114240 A1* | 5/2013 | Makita | G01D 13/28 362/23.19 |
| 2013/0141311 A1* | 6/2013 | Ho | G09G 3/003 345/7 |
| 2014/0132407 A1* | 5/2014 | Kumai | G08G 1/0962 340/439 |
| 2014/0222244 A1* | 8/2014 | Ogawa | 701/1 |
| 2014/0253821 A1* | 9/2014 | Takatoh et al. | 349/11 |
| 2015/0042541 A1* | 2/2015 | Hashimoto | H04N 9/3129 345/7 |
| 2015/0092118 A1* | 4/2015 | Hada | B60K 35/00 349/11 |

FOREIGN PATENT DOCUMENTS

| | | |
|---|---|---|
| JP | 2010-262161 A | 11/2010 |
| JP | 2011-128450 A | 6/2011 |
| JP | 2011-240868 A | 12/2011 |
| JP | 2012-62034 A | 3/2012 |
| JP | 2015-11456 A | 1/2015 |

OTHER PUBLICATIONS

Search Report for the related Japanese Patent Application No. 2013-144887 dated Feb. 17, 2017.

* cited by examiner

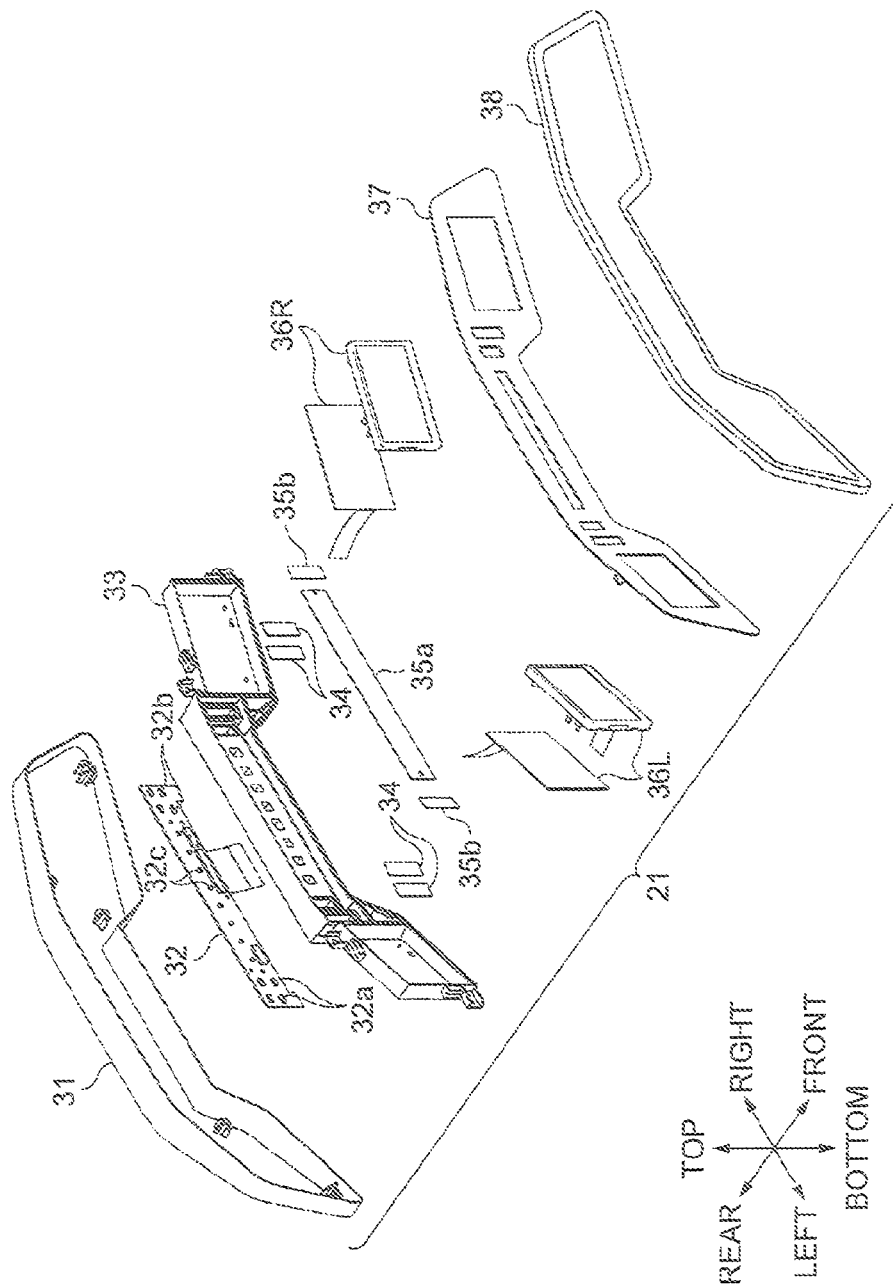

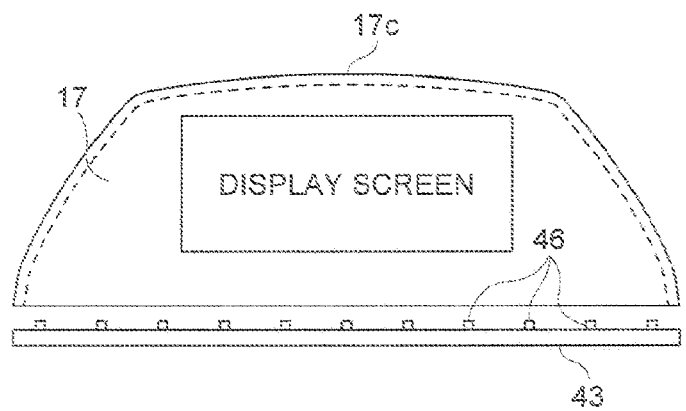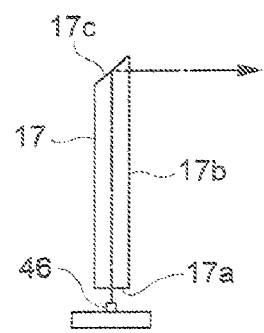
FIG. 9A  FIG. 9B
FIG. 10
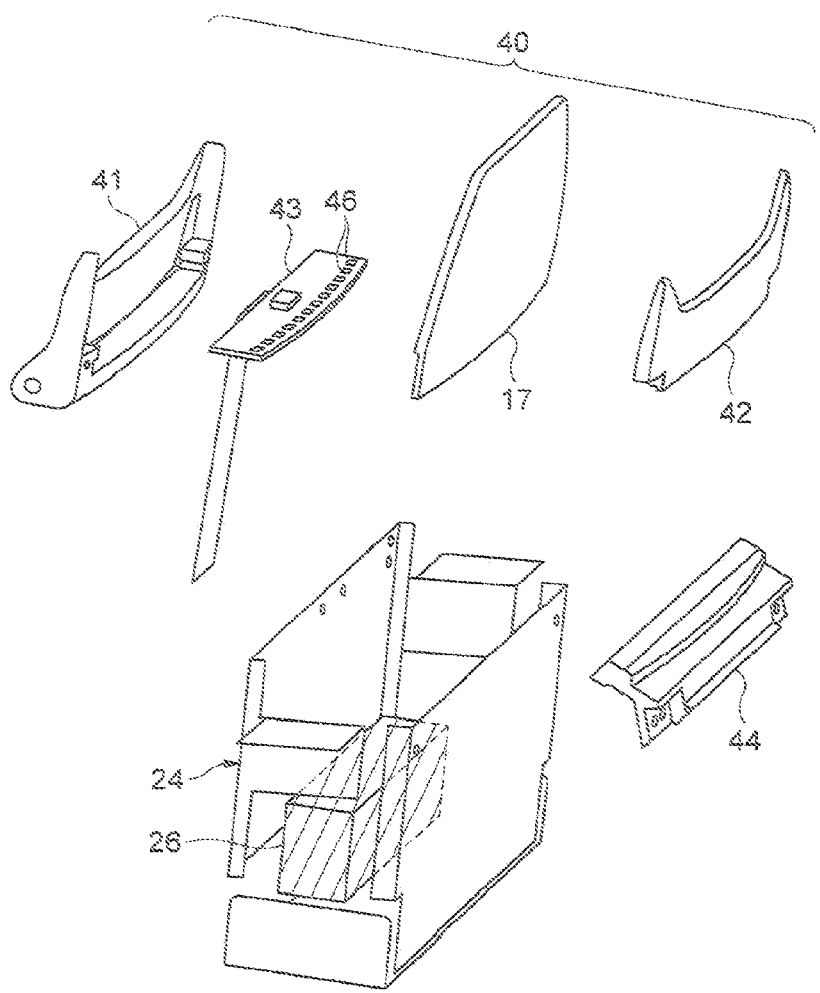

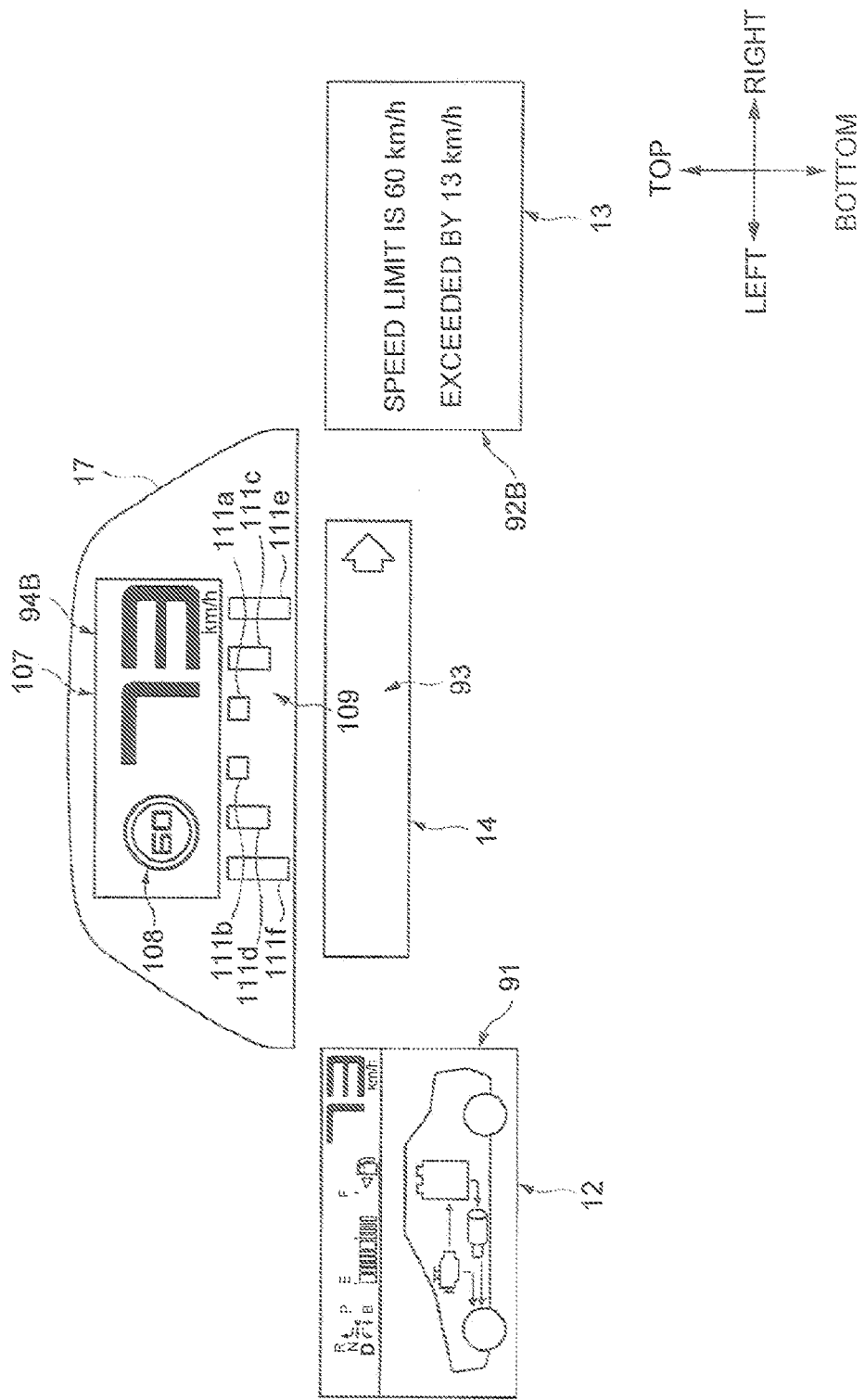

HEAD-UP DISPLAY DEVICE AND DISPLAY UNIT

CROSS-REFERENCE TO RELATED APPLICATIONS

The present application claims priority to and incorporates by reference the entire contents of Japanese Patent Application No. 2013-144887 filed in Japan on Jul. 10, 2013.

BACKGROUND OF THE INVENTION

1. Field of the Invention

The present invention relates to a head-up display device mounted on a vehicle and a display unit including the head-up display device, and in particular, relates to a technology for warning against excessive speed of the vehicle.

2. Description of the Related Art

Head-up display devices mounted on vehicles are typically configured such that display light emitted from a projection unit is projected onto an optical member (half mirror) called a combiner; and light reflected off a surface of the combiner is reflected in a viewing direction of the driver and guided to a predetermined eye point as a viewing position of the driver (see, for example, Japanese Patent Application Laid-open No. 2006-11122). The combiner is disposed at a position in front of the driver's seat, for example, above the instrument panel, that is easily visually recognizable by the driver. A front windshield, instead of the combiner, may be used as the surface for reflecting the display light.

The head-up display device forms a display image as a virtual image at a position anterior to the combiner in the vehicle forward direction (that is, posterior in the viewing direction). This offers an advantage that the driver requires only small focus adjustment for visually recognizing the display image. In addition, the head-up display device allows the driver to visually recognize the display image anterior to the combiner in the vehicle forward direction superimposed on a view anterior to the vehicle that is visually recognized through the combiner. The head-up display device can thus present information in a novel mode different from display using an ordinary display panel.

Such a head-up display device can be used for, for example, displaying the vehicle traveling speed. The head-up display device is therefore suitable for displaying highly important information such as vehicle speed, because the driver can visually recognize the speed display with his/her head up and without involving any considerable movement of the sight line or focus adjustment.

Speed limits are set for various roads on which vehicles travel based on the Road Traffic Law and the like. For example, the maximum speed for roads with no speed limit sign and marking is set to 60 km/h for open roads and 100 km/h for highways. Furthermore, the speed limits are determined in accordance with the respective road conditions, and the speed limits therefor are explicitly informed with signs and markings on the roads.

The driver of a vehicle will normally drive the vehicle at a speed within the speed limit range so as not to violate the provisions of the Road Traffic Law and the like. That is to say, the driver will grasp the speed limit set for the road on which the vehicle is traveling currently with signs and markings on the road, read the current traveling speed of the own vehicle from the display on a speed meter, and drive the vehicle while confirming that the vehicle speed does not exceed the speed limit.

Even when the driver tries to follow the provisions of the Road Traffic Law and the like, the driver can mistakenly recognize the speed limit set for the current road due to oversight of the sign or marking on the road, for example. The driver can mistakenly recognize the speed display when he/she visually recognizes the display on the speed meter.

The present invention has been made in view of the above-mentioned circumferences, and an object thereof is to provide a head-up display device that allows a driver to easily grasp a relation between the current traveling speed of the vehicle and the speed limit set for a road on which the vehicle is traveling currently, and a display unit including the head-up display device.

SUMMARY OF THE INVENTION

The above-mentioned object according to the invention is achieved by the following configurations.

According to one aspect of the present invention, a head-up display device mounted on a vehicle, includes a projector configured to project display light including a display image onto a reflecting plate; a pair of first light sources and a pair of second light sources configured to project emitted light onto the reflecting plate; and a controller connected to the first light sources and the second light sources, wherein the display light from the projector is reflected by the reflecting plate in a viewing direction to define a display area on the reflecting plate, the emitted light from the first light sources is reflected by the reflecting plate in the viewing direction to display a pair of first guide lights side by side adjacent to the display area on the reflecting plate, the emitted light from the second light sources is reflected by the reflecting plate in the viewing direction to display a pair of second guide lights at outer sides of the respective first guide lights on the reflecting plate, and the controller controls lighting states of the first light sources and the second light sources to change at least one of number of lights to be lit, a lighting cycle, and a lighting order of the first light sources and the second light sources in accordance with a differential value between a current traveling speed of the vehicle and a speed limit set for a road on which the vehicle is traveling.

According to another aspect of the present invention, when the current traveling speed of the vehicle exceeds the speed limit, the controller controls the projector to display a predetermined warning pattern relating to the speed limit on the display area.

According to still another aspect of the present invention, an optical path length from the reflecting plate to the first light sources in the viewing direction differs from an optical path length from the reflecting plate to the second light sources in the viewing direction.

According to still another aspect of the present invention, a display unit includes the head-up display device according to any one of the aspects; and a meter unit including a display section, wherein the controller causes the display section to display a warning display when the differential value exceeds a predetermined threshold value.

The present invention has been briefly described. The detail of the present invention will be more apparent from the following description of the mode (hereinafter referred to as an "embodiment") for carrying out the invention with reference to the accompanying drawings.

BRIEF DESCRIPTION OF THE DRAWINGS

FIG. 8 is an exploded perspective view illustrating the configuration of a meter subassembly;

FIGS. 9A and 9B illustrate the combiner and a combiner illumination substrate, FIG. 9A being a front elevational view and FIG. 9B being a side elevational view;

FIG. 10 is an exploded perspective view illustrating the configuration of a driving unit subassembly;

FIG. 18 is a front view illustrating an exemplary general display of the display unit at an excessive speed time.

DETAILED DESCRIPTION OF THE PREFERRED EMBODIMENTS

A head-up display device and a display unit according to a specific preferred embodiment of the present invention will be described below with reference to the accompanying drawings.

[Configuration of Mechanical Section]
[Explanation of Overall Outline]

Figure 1:
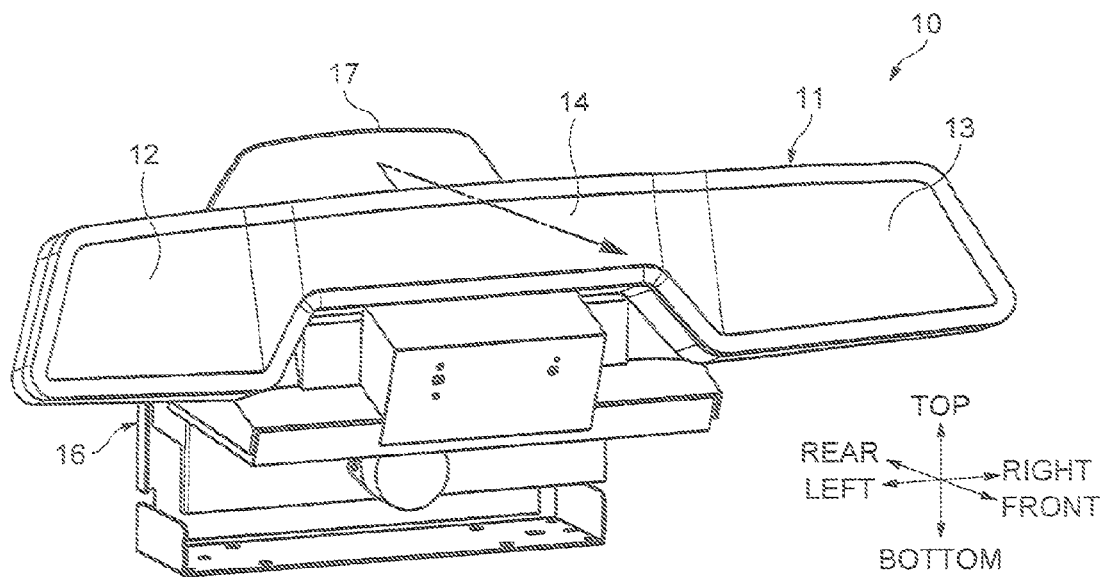
FIG. 1 is a perspective view illustrating the general exterior appearance of a display unit as viewed from the front side.
Figure 2:
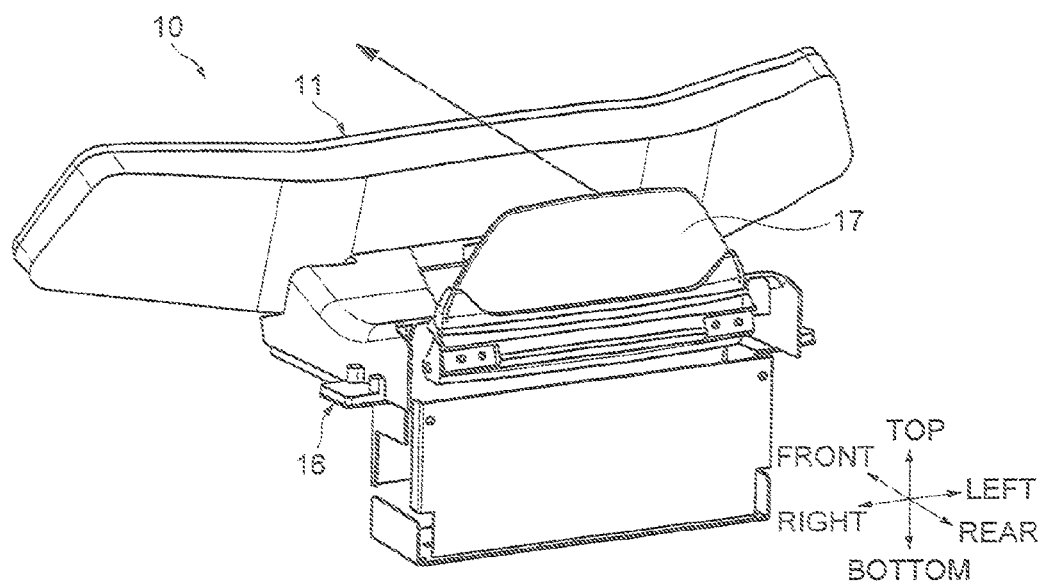
FIG. 2 is a perspective view illustrating the general exterior appearance of the display unit as viewed from a rear side.
Figure 3:
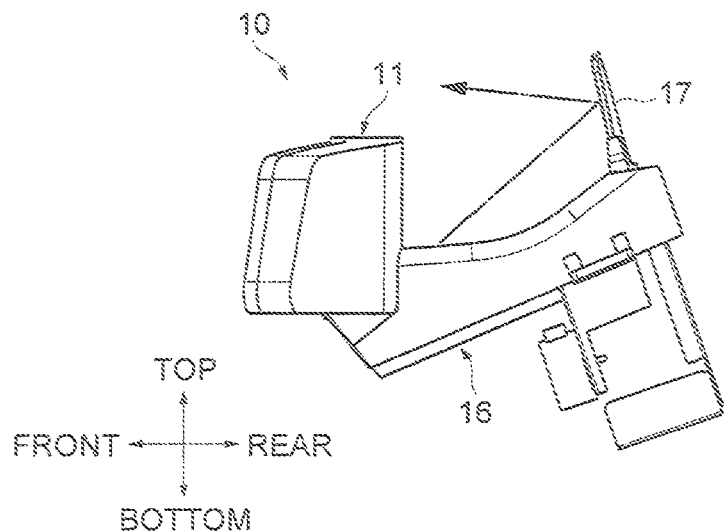
FIG. 3 is a perspective view illustrating the general exterior appearance of the display unit as viewed from a lateral side.
Figure 4:
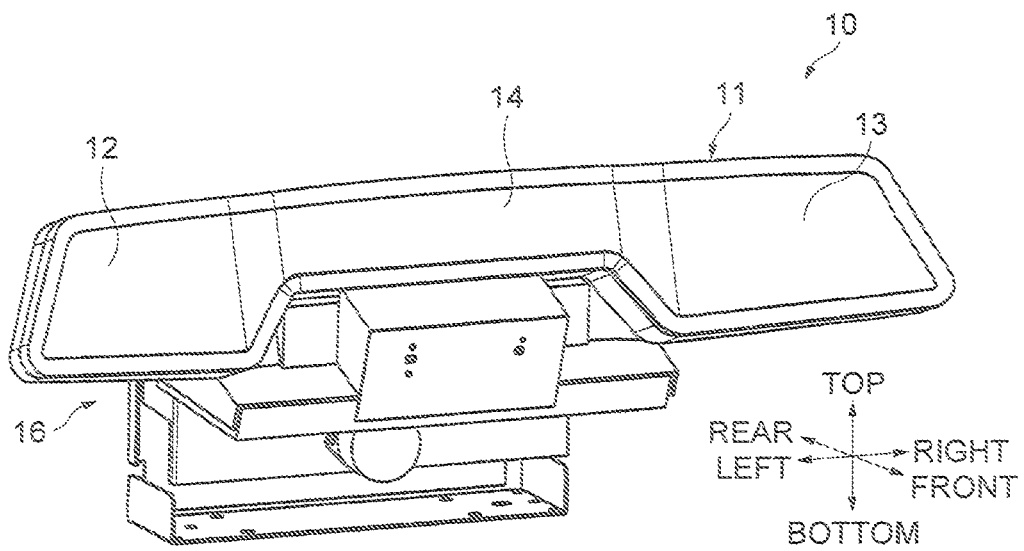
FIG. 4 is a perspective view illustrating the display unit with a combiner stored therein as viewed from the front side.
Figure 5:
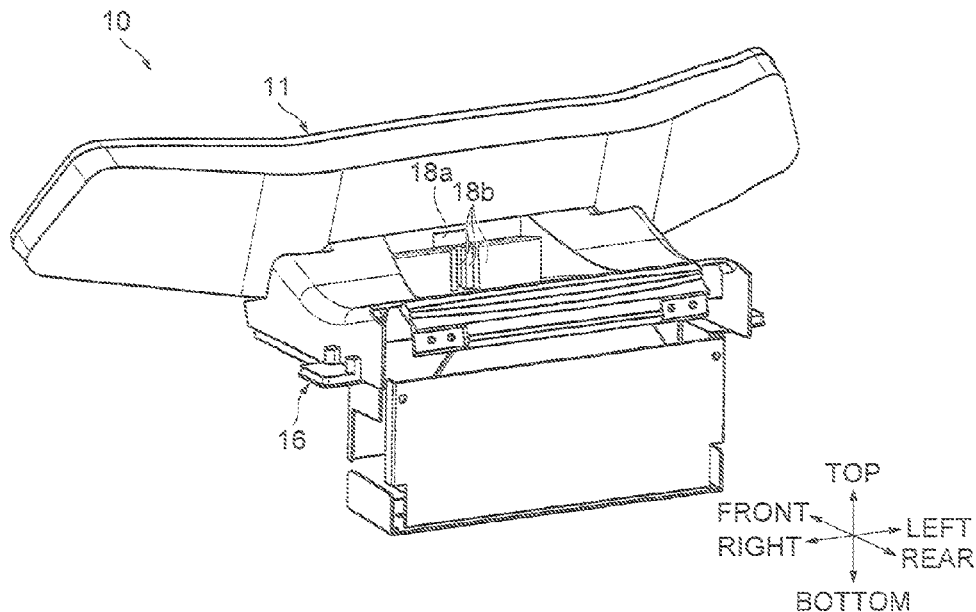
FIG. 5 is a perspective view illustrating the display unit with the combiner stored therein as viewed from the rear side.
Figure 6:
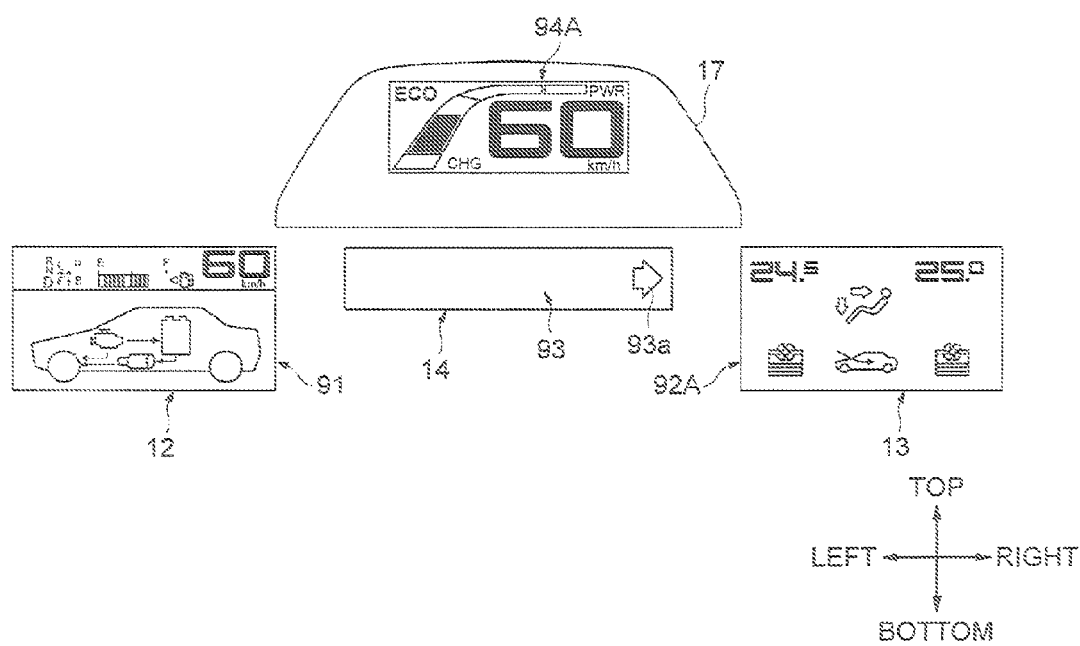
FIG. 6 is a front elevational view illustrating an exemplary general display by the display unit under a normal driving state.

FIGS. 1 to 3 are perspective views illustrating the general exterior appearance of a display unit 10, FIG. 1 illustrating the display unit 10 as viewed from a front side, FIG. 2 illustrating the display unit 10 as viewed from a rear side, and FIG. 3 illustrating the display unit 10 as viewed from a lateral side. FIGS. 1 to 3 illustrate a use condition in which a combiner 17 protrudes from a housing. FIGS. 4 and 5 are perspective views illustrating the display unit 10 in a storing position in which the combiner 17 is stored inside the housing, FIG. 4 illustrating the display unit 10 as viewed from the front side and FIG. 5 illustrating the display unit 10 as viewed from the rear side. FIG. 6 is a front elevational view illustrating an exemplary general display by the display unit 10 under a normal driving state.

In FIGS. 1 to 6, the directional expressions of "left" and "right" correspond to the left and right of the display unit 10, disposed in front of driver's seat of a vehicle, as viewed from the driver's seat. In FIGS. 1 to 6, the directional expressions of "front" and "rear" correspond to the front and rear directions of the display unit 10. Specifically, "front" refers to a direction in which the display unit 10 faces the driver sitting in the driver's seat, and "rear" refers to the rear side of the display unit 10 as viewed from the driver. Additionally, in FIGS. 1 to 6, the directional expressions of "top" and "bottom" correspond to the vertical direction of the vehicle. The drawings to be later referred to other than FIGS. 1 to 6 also use the directional expressions of "left", "right", "front", "rear", "top", and "bottom" in the same manner.

The display unit 10 illustrated in FIGS. 1 to 6 includes a meter unit 11 integrated with a head-up display (HUD) device 16. The display unit 10 is embedded inside the instrument panel (not illustrated) of the vehicle with a part thereof exposed on the outside of the instrument panel so as to be visually recognized by the driver. More specifically, the display unit 10 is disposed such that the combiner 17 of the HUD device 16 in the use position protrudes from the instrument panel and in the stored position is stored in a position lower than the instrument panel. Specifically, the combiner 17 is visually recognizable by the driver in the use position and is not visually recognized by the driver in the stored position.

As illustrated in FIGS. 1 to 3, the meter unit 11 includes two display sections, a left side display 12 and a right side display 13. As illustrated in FIG. 1, the left side display 12 is disposed on the left side of the meter unit 11, and the right side display 13 is disposed on the right side of the meter unit 11. The meter unit 11 further includes a center display 14 between the left side display 12 and the right side display 13, the center display 14 capable of displaying a display light for warning or other purposes. These elements will be described in detail later. The meter unit 11 including these display sections is used, similar to ordinary vehicular meter units, for displaying various types of information useful for vehicle driving. The meter unit 11 displays, for example, a speedometer that displays the traveling speed of the vehicle and an odometer that displays the travel distance of the vehicle. The meter unit 11 also displays, for example, an indicator that indicates the shift position of a transmission lever, a fuel gauge that indicates a level of fuel still available, and a warning display that warns of any fault. A liquid crystal display panel capable of giving a graphic display is used for each of the left side display 12 and the right side display 13 of the meter unit 11, so that the left side display 12 and the right side display 13 can display, for example, an image (video image) captured by an in-vehicle camera.

The HUD device 16 displays various types of information by projecting a display image onto the plate-shaped combiner 17 as a translucent reflecting plate (half mirror). The combiner 17 in the use position protrudes upwardly from the center display 14, as illustrated in FIGS. 1 to 3. This allows the driver, when a display image is displayed on the combiner 17, to visually recognize the display image without moving the sight line in a large amount from a normal driving position. In addition, the HUD device 16 forms the display image as a virtual image at a position farther in the "rear" direction than the combiner 17. This requires only small focus adjustment for the driver to visually recognize the display. Thus, the HUD device 16 can offer a highly visible display function requiring only a small movement of the sight line and only small focus adjustment for the driver. In addition, the HUD device 16 allows the driver to visually recognize the display image displayed on the combiner 17 superimposed on a view anterior to the vehicle that is visually recognized through the combiner 17. The HUD device 16 can thus present information in a mode different from display using an ordinary display panel.

FIG. 6 is a front elevational view illustrating an exemplary general display by the display unit under the normal driving state. As illustrated in FIG. 6, the combiner 17 above the center display 14 displays information having higher priority such as the current vehicle speed (letters or numerals such as 60 km/h) and an index indicating an ecology degree of driving, in a large, easy-to-view format, as an HUD display content 94A. On the left side display 12, for example, a display element indicating the condition of a hybrid system, a speedometer, a fuel gauge, and the shift position of a transmission are displayed as a left screen display content 91. On the right side display 13, for example, a display element indicating the condition of air conditioning is displayed as a right screen display content 92A. The center display 14 displays a central display content 93. For example, a right turn display 93a that will flash to inform the driver that a corresponding direction indicator is flashing.

The following configuration is exemplified as a different usage mode of the display unit 10. That is, the left side display 12 of the meter unit 11 displays the speed meter and the odometer, the right side display 13 displays images obtained by shooting the right-rear and left-rear sides by in-vehicle cameras, and the combiner 17 displays vehicle peripheral information superimposed on the sight ahead of the vehicle. The following configuration is also exemplified as another different usage mode of the display unit 10. That is, the left side display 12 displays an image obtained by shooting the left-rear side by the in-vehicle camera, the right side display 13 displays an image obtained by shooting the right-rear side by the in-vehicle camera, and the combiner 17 displays the vehicle speed.

[Explanation of Detailed Configurations of Respective Units]

Figure 7:
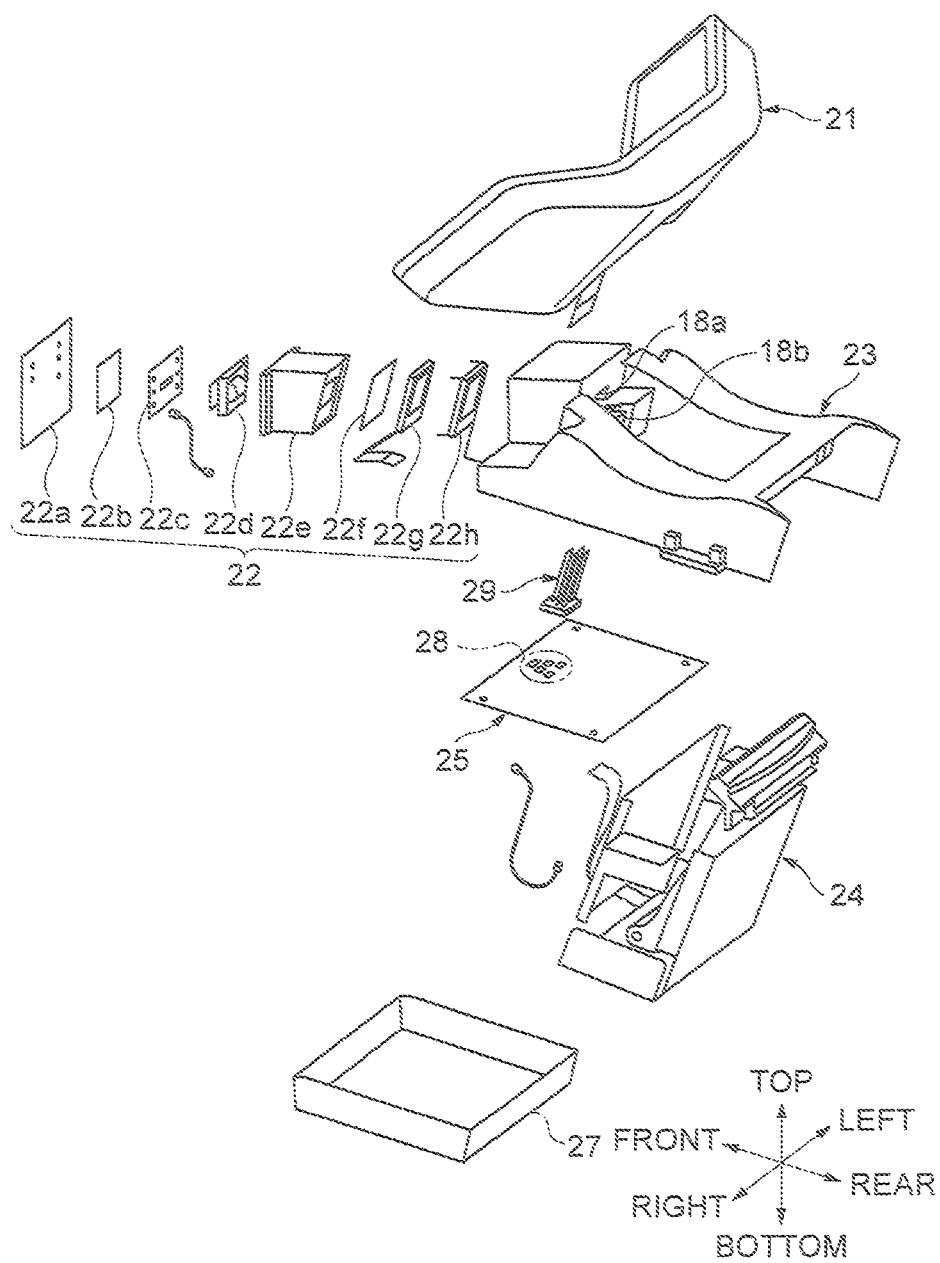
FIG. 7 is an exploded perspective view schematically illustrating the general configuration of the display unit.

FIG. 7 illustrates the display unit 10 disassembled into main components.

As illustrated in FIG. 7, the display unit 10 includes a meter subassembly 21, a display-light projector 22, a projector case 23, a driving unit assembly 24, a main substrate assembly 25, a cover 27, an ambient light source 28, and an ambient prism unit 29.

[Explanation of Display-Light Projector 22]

The display-light projector 22 can project display light including a display image to be displayed by the HUD device 16 onto the combiner 17.

As illustrated in FIG. 7, the display-light projector 22 includes a heat sink 22a, a heat conducting sheet 22b, a backlight substrate 22c, a lens array 22d, a backlight case 22e, a diffusion sheet 22f, a liquid crystal display 22g, and a shield case 22h that are arranged in this sequence from the front side.

The liquid crystal display 22g includes a plurality of display pixels arranged two-dimensionally. The pixels can be individually controlled for, for example, turning on or off the display and display colors. This allows the liquid crystal display 22g to display any type of visible information, such as graphics, characters, and images, on a screen.

The liquid crystal display 22g is a transparent liquid crystal display panel. Illuminated from its back side by a backlight on the backlight substrate 22c, the liquid crystal display 22g can project display light including the display image to be displayed on the screen. The display light is projected onto the combiner 17 through a display light emitting port 18a that is an opening formed in the projector case 23 as illustrated in FIGS. 5 and 7 (see also FIG. 12 to be referred to later).

The combiner 17 is incorporated in the driving unit assembly 24 and supported so as to be vertically movable. With the HUD device 16 in a display condition, the combiner 17 moves to a position at which the combiner 17 protrudes from the driving unit assembly 24 to reflect the display light emitted from the display-light projector 22. The Light reflected off a reflecting surface of the combiner 17 is then directed toward a predetermined eye point corresponding to the position of the driver's eye. That is, the light reflected off the reflecting surface of the combiner 17 travels in the viewing direction of the driver. This allows the driver to visually recognize visible information displayed on the screen of the liquid crystal display 22g as a virtual image imaged on the combiner 17.

[Explanation of Outline of Ambient Light Display]

In the present embodiment, any light other than the display image of the liquid crystal display 22g can also be projected onto and displayed on a surface of the combiner 17 as a virtual image. For this purpose, the ambient light source 28 is disposed on the main substrate assembly 25. In addition, the ambient prism unit 29 is disposed so as to face the ambient light source 28. The ambient light source 28 includes a plurality of light emitting diodes (LEDs). The ambient prism unit 29 includes a plurality of prisms, each being disposed so as to face a corresponding one of the light emitting diodes.

Light emitted from the ambient light source 28 enters the ambient prism unit 29 from below to be reflected off a surface near the top, and is projected onto the combiner 17 through an ambient light emitting port 18b (see FIGS. 5 and 7) formed in the projector case 23. This ambient light is also reflected off the reflecting surface of the combiner 17 and travels in the viewing direction of the driver. Thus, when the ambient light source 28 emits light, the driver can also visually recognize the ambient light as a virtual image imaged on the combiner 17.

In the present embodiment, a plurality of ambient light can be three-dimensionally displayed using a difference in optical path lengths. The detail of this structure will be described later.

[Explanation of Meter Assembly 21]

The meter unit 11 includes a main body as the meter subassembly 21. FIG. 8 is an exploded perspective view illustrating the meter subassembly 21 separated into main components.

As illustrated in FIG. 8, the meter subassembly 21 includes a rear cover 31, a substrate 32, a case 33, a plurality of diffusion sheets 34, telltale lenses 35a, 35b, a meter left display 36L, a meter right display 36R, a facing plate 37, and a front glass 38 that are arranged in this sequence from the rear side.

The substrate 32 has a rectangular shape extending laterally. Light emitters 32a are disposed near the left end of the substrate 32, and light emitters 32b are disposed near the right end of the substrate 32. Additionally, light emitters 32c are disposed between the light emitters 32a and the light emitters 32*b*. Each of the light emitters 32*a*, the light emitters 32*b*, and the light emitters 32*c* includes a plurality of independent light emitting diodes.

Light emitted from each of the light emitters 32*a*, the light emitters 32*b*, and the light emitters 32*c* travels toward the "front", passing through in sequence an aperture in the case 33, the diffusion sheets 34, the telltale lenses 35*a*, 35*b*, and an aperture in the facing plate 37 and appearing as display light for, for example, various types of warnings on the surface of the front glass 38. The display light is displayed on the center display 14 described earlier to be visually recognized by the driver. The front glass 38 is smoked to be translucent.

The meter left display 36L and the meter right display 36R are each an independent color liquid crystal display panel that includes a plurality of display pixels arranged two-dimensionally. The pixels of the meter left display 36L and the meter right display 36R can be individually controlled for, for example, turning on or off the display and display colors. This allows the meter left display 36L and the meter right display 36R to display any type of visible information, such as graphics, characters, and images, on a screen.

A display content on the screen of each of the meter left display 36L and the meter right display 36R pass through the aperture in the facing plate 37 and are displayed on the surface of the front glass 38. The display content of the meter left display 36L is displayed on the left side display 12 described earlier to be visually recognized by the driver, and the display content of the meter right display 36R is displayed on the right side display 13 to be visually recognized by the driver.

[Configuration Near Combiner]

FIGS. 9A and 9B illustrate the combiner 17 and a combiner illumination substrate 43, FIG. 9A being a front elevational view and FIG. 9B being a side elevational view. FIG. 10 is an exploded perspective view illustrating main components of a driving unit subassembly 40 housed in the driving unit assembly 24.

As illustrated in FIG. 10, the driving unit subassembly 40 includes the combiner 17, a front combiner holder 41, a rear combiner holder 42, and the combiner illumination substrate 43. Specifically, the combiner 17 is disposed between the front combiner holder 41 and the rear combiner holder 42 to be integrally held with the holders.

The combiner illumination substrate 43 having a thin sheet shape is disposed at a position to support the lower end of the combiner 17. An end face light source 46 is disposed on the upper surface of the combiner illumination substrate 43. The end face light source 46 includes a plurality of light emitting diodes that are arrayed laterally in a row.

Thus, as illustrated in FIGS. 9A, 9B, and 10, the end face light source 46 on the combiner illumination substrate 43 is disposed to face the lower end face of the combiner 17. The lower end face of the combiner 17 has an illumination light entering part 17*a* formed therein that guides illumination light from the end face light source 46 to the inside of the combiner 17. In addition, an illumination light reflecting part 17*c* is formed on the upper end face and lateral end faces of the combiner 17 in the directions orthogonal to the thickness direction of the combiner 17. As illustrated in FIGS. 9A and 9B, in the present embodiment, the illumination light reflecting part 17*c* on the upper end face is formed into a slope inclined so as to be spaced further apart from the combiner illumination substrate 43. The illumination light reflecting part 17*c* on the lateral end faces is a slope inclined so as to expand outwardly in a circumferential direction toward the front. The slope on the end portions of the combiner 17 reflects the illumination light from the end face light source 46 toward the front. It is noted that the illumination light reflecting part 17*c* of the combiner 17 may be formed to cover the entire upper and lateral end faces as in the present embodiment or formed on a part of the end faces. For example, the illumination light reflecting part 17*c* may be formed on the upper end face and either one of the lateral end faces.

The following describes paths of display light projected from the display-light projector 22 and illumination light emitted from the end face light source 46.

The display light projected from the display-light projector 22 passes through the display light emitting port 18*a* and enters a display light reflecting surface 17*b* that is a surface on one side (front side) in the thickness direction of the combiner 17. The display light is then reflected off the display light reflecting surface 17*b* and directed toward the predetermined eye point that corresponds to the position of the driver's eye. This allows the driver to visually recognize a display image included in the display light.

When the end face light source 46 illuminates, the illumination light from the end face light source 46 is guided to the inside of the combiner 17 through the illumination light entering part 17*a*. The illumination light then transmits through the combiner 17 and is reflected off the surface of the illumination light reflecting part 17*c* to reach the eye point as illustrated in FIG. 9B. This allows the driver to visually recognize the end of the combiner 17 illuminated in a band as illustrated in FIG. 9A. As described above, the HUD device 16 of the display unit 10 can illuminate the end faces of the combiner 17, thereby achieving a novel visual effect as compared with a known unit projecting the display image only on the surface of the combiner 17.

The driving unit subassembly 40 illustrated in FIG. 10 is housed in the driving unit assembly 24 and connected to a drive mechanism 26. The drive mechanism 26 can vertically move, with its driving force, the driving unit subassembly 40 including the combiner 17. The drive mechanism 26 can thus position the combiner 17 in the stored position in which the entire combiner 17 is stored inside the driving unit assembly 24 and in the use position in which the combiner 17 protrudes upwardly from the instrument panel. With the combiner 17 in the stored position, an instrument panel cover 44 illustrated in FIG. 10 covers an opening of the instrument panel.

[Detailed Explanation of Ambient Light Display]

Figure 11:
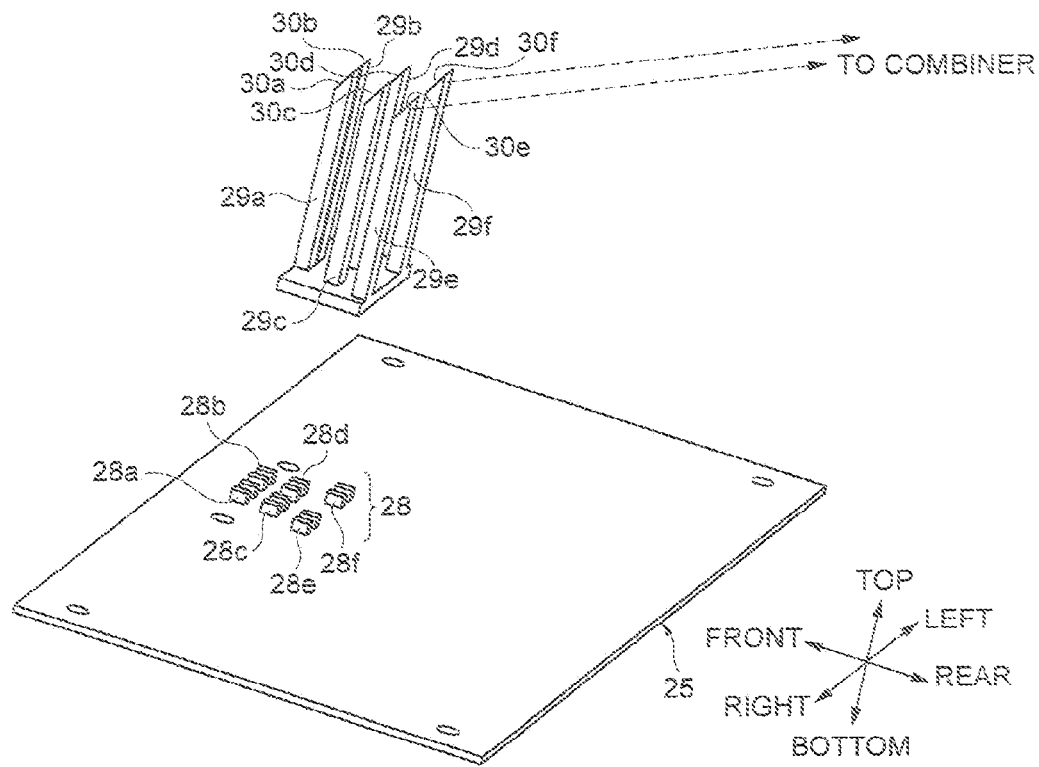
FIG. 11 is an enlarged view illustrating a main substrate assembly.
Figure 12:
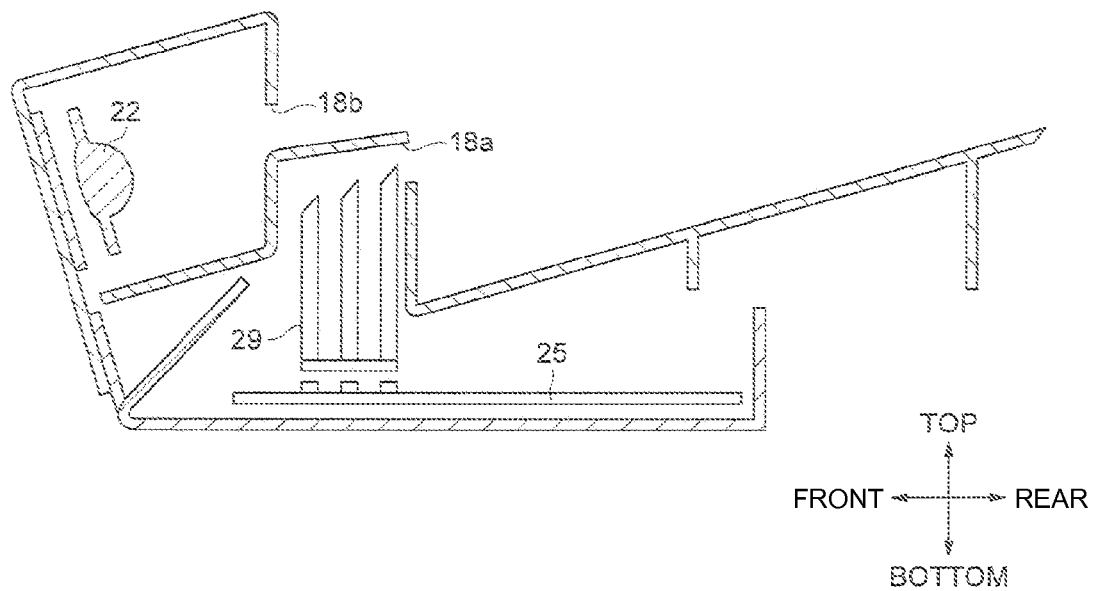
FIG. 12 is a side elevational view illustrating the main substrate assembly for explaining the disposition of parts of the main substrate assembly.
Figure 13:
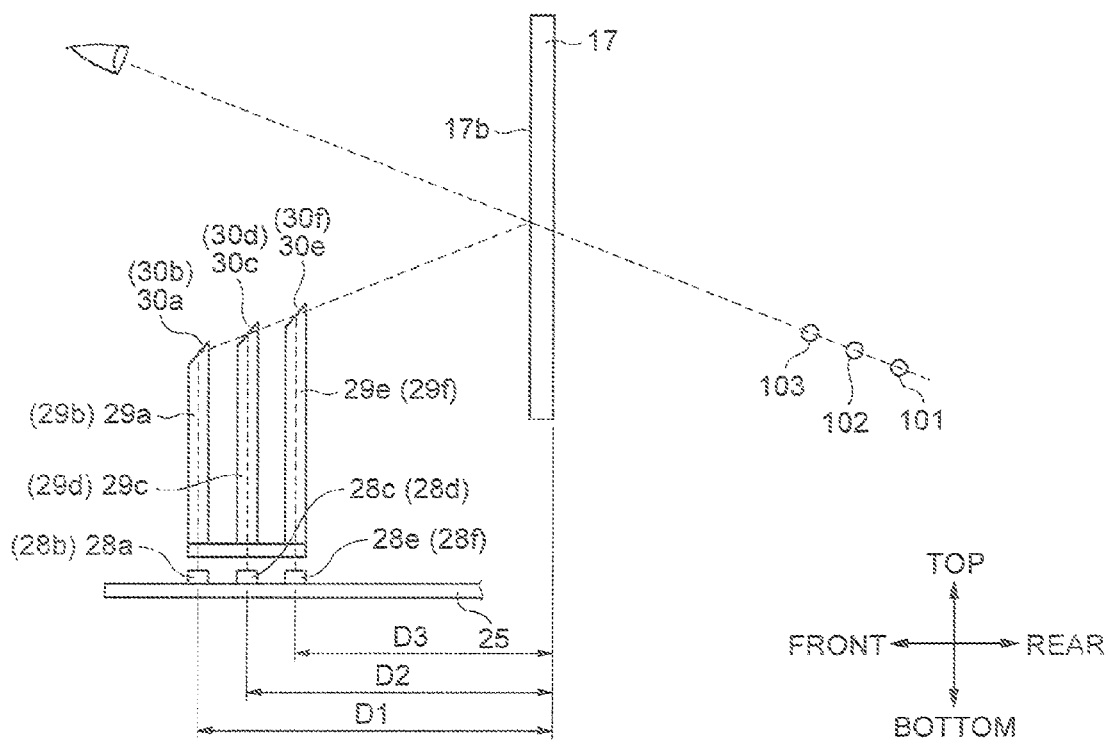
FIG. 13 is a side elevational view illustrating the main substrate assembly and the combiner for explaining an optical path of a guide light by using an ambient light source.
Figure 14:
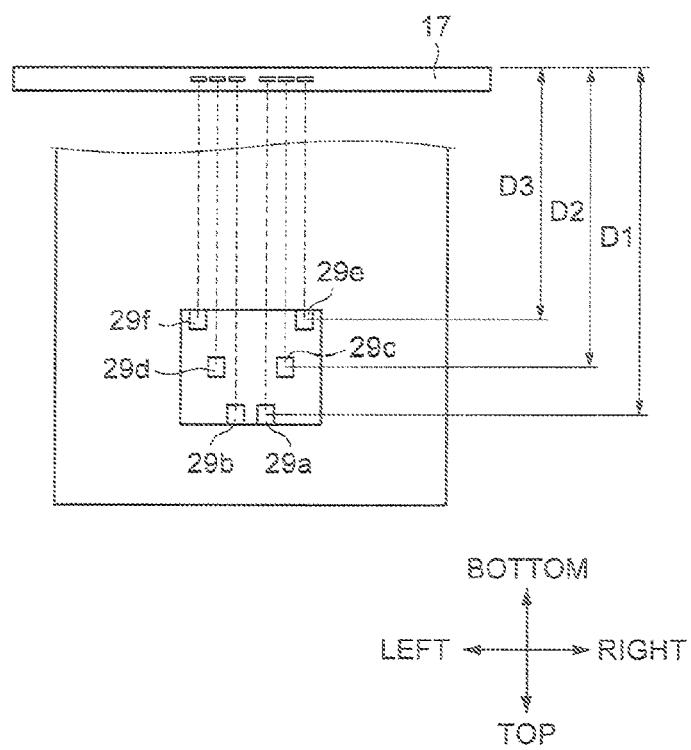
FIG. 14 is a plan view illustrating the main substrate assembly and the combiner for explaining the optical path of the guide light by using the ambient light source.

FIG. 11 is an enlarged view illustrating the main substrate assembly. FIGS. 12 to 14 are explanatory drawings, FIG. 12 being a side elevational view illustrating the main substrate assembly, FIGS. 13 and 14 being a side elevational view and a plan view, respectively, illustrating the main substrate assembly and the combiner.

As illustrated in FIG. 11, the ambient prism unit 29 includes six prisms 29*a*, 29*b*, 29*c*, 29*d*, 29*e*, and 29*f* that are disposed at positions different from each other in a plane of the main substrate assembly 25. The six prisms extend vertically, having one end in the longitudinal direction connected to be generally integrated with each other. Each of the prisms 29*a*, 29*b*, 29*c*, 29*d*, 29*e*, 29*f* has the other end (near its apex) pointed sharply to define respective reflecting surfaces 30*a*, 30*b*, 30*c*, 30*d*, 30*e*, and 30*f* that reflect light emitted from the ambient light source 28 to be described later toward the combiner 17.

In the present embodiment, the prisms 29*a*, 29*b* adjacent laterally to each other are paired up, the prisms 29*c*, 29*d* adjacent laterally to each other are paired up, and the prisms 29e, 29f adjacent laterally to each other are paired up. As illustrated in FIG. 14, in the lateral direction, the distance between the prisms 29a and 29b is the smallest. The prisms 29c and 29d are disposed outside the prisms 29a and 29b, respectively, and the prisms 29e and 29f are disposed outside the prisms 29c and 29d, respectively. As illustrated in FIG. 14, the pairs of the prisms are juxtaposed laterally with the same lateral center.

As illustrated in FIG. 13, the three pairs of prisms 29a and 29b, 29c and 29d, and 29e and 29f are disposed different positions from each other in the front-rear direction. In the present embodiment, the pair of prisms 29a and 29b, the pair of prisms 29c and 29d, and the pair of prisms 29e and 29f are disposed in this sequence from the side away from the combiner 17 (specifically, from the front side).

The ambient light source 28 includes six light sources 28a to 28f. As illustrated in FIG. 11, the light sources 28a to 28f are each a pair of a light emitting diode that emits red light and a light emitting diode that emits green light. The six light sources 28a to 28f are disposed at positions facing the lower end faces of the prisms 29a to 29f, as illustrated in FIGS. 11 to 14.

As illustrated in FIG. 13, light emitted from the light source 28a enters and passes through the prism 29a. The light is then reflected off the reflecting surface 30a near the apex of the prism 29a and is directed toward the combiner 17 through the ambient light emitting port 18b illustrated in FIG. 12 (see also FIGS. 5 and 7). The light is reflected off the display light reflecting surface 17b of the combiner 17 in the viewing direction as illustrated in FIG. 13, traveling toward the eye point that corresponds to the position of the driver's eye. In this case, the image viewed by the driver is visually recognized through the combiner 17 as a virtual image 101 positioned ahead of the combiner 17.

Similarly, light emitted from the light source 28c enters and passes through the prism 29c and is reflected off the reflecting surface near the apex of the prism 29c to be directed toward the combiner 17. This light is reflected off the combiner 17 in the viewing direction and directed toward the eye point to be visually recognized as a virtual image 102 by the driver. Similarly, light emitted from the light source 28e enters and passes through the prism 29e and is reflected off the surface near the apex of the prism 29e to be directed toward the combiner 17. This light is reflected off the combiner 17 in the viewing direction and directed toward the eye point to be visually recognized as a virtual image 103 by the driver. The same holds for light emitted from the other light sources 28b, 28d, and 28f.

Because the three pairs of prisms 29a and 29b, 29c and 29d, and 29e and 29f are disposed different positions from each other in the front-rear direction, the optical paths of the respective rays of light emitted from the respective light sources differ in length from each other. Specifically, the distances in the viewing direction of the driver (the front-rear direction) between each of the prisms 29a to 29f and the combiner 17 differ as indicated by distances D1, D2, and D3 illustrated in FIGS. 13 and 14. This results in differences corresponding to the distances D1, D2, and D3 in the optical path length from each of the light sources 28a to 28f to the eye point.

Due to these differences in the optical path length, the light emitted from the light sources 28a and 28b forms an image at the position of the virtual image 101, the light emitted from the light sources 28c and 28d forms an image at the position of the virtual image 102, and the light emitted from the light sources 28e and 28f forms an image at the position of the virtual image 103. Specifically, the virtual images 101 to 103 illustrated in FIG. 13 are formed at different positions in the depth direction from the driver so as to be visually recognized as if they were lit up at different positions in the front-rear direction.

As illustrated in FIG. 12, the display-light projector 22 is disposed posterior to the ambient light source 28. As a result, the optical path length from the display-light projector 22 to the combiner 17 is greater than the distances D1, D2, D3. Thus, the virtual images 101 to 103 are imaged posterior to the display image displayed on the combiner 17, and thus the guide lights 111a to 111f are imaged posterior to the display image.

[Configuration of Electrical Circuit]

Figure 15:
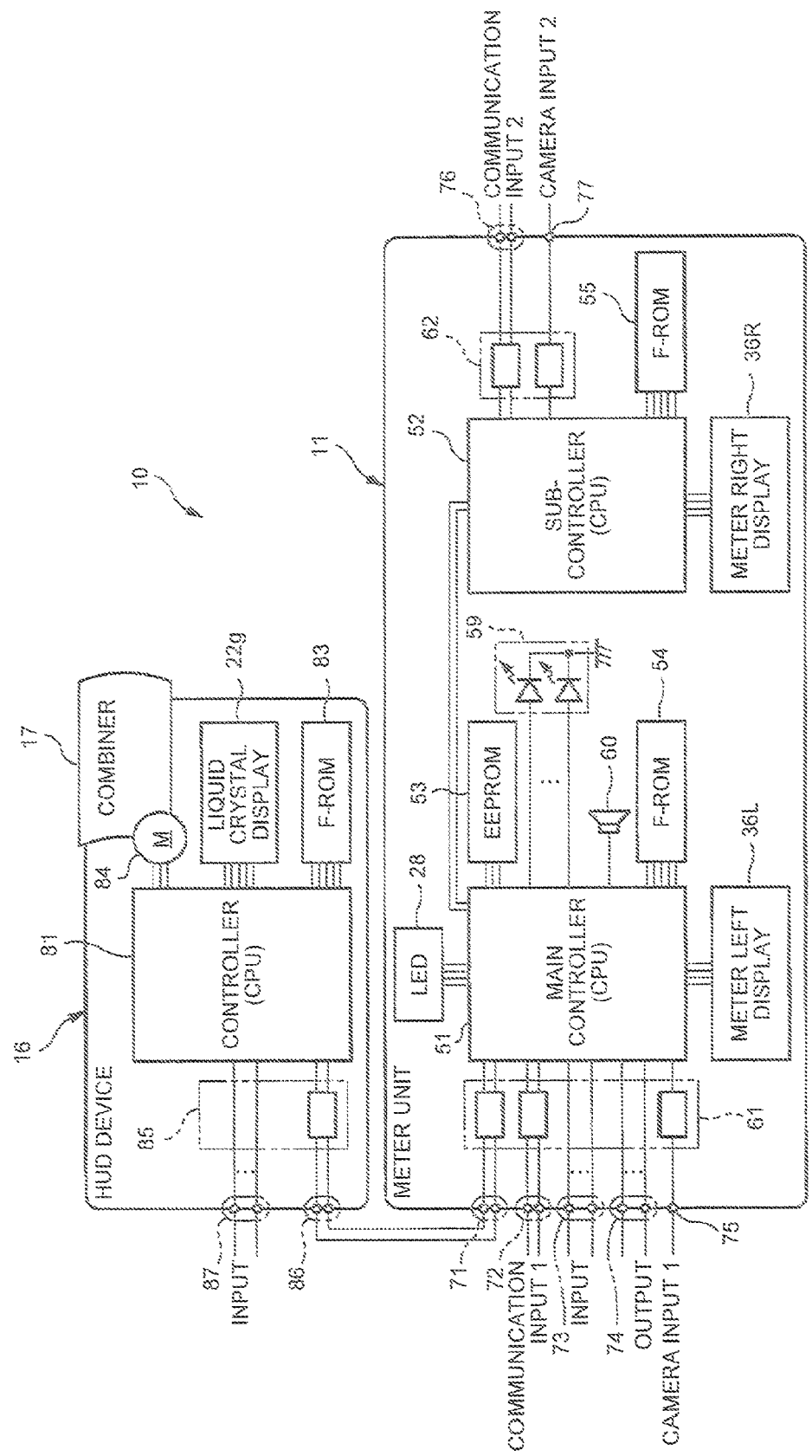
FIG. 15 is a block diagram illustrating the general configuration of electric circuits of the display unit.

FIG. 15 illustrates a general configuration of electric circuits of the display unit 10.

[Explanation of Meter Unit 11]

As illustrated in FIG. 15, the electric circuit of the meter unit 11 includes a main controller 51, a sub-controller 52, memories 53 to 55, the meter left display 36L, the meter right display 36R, the ambient light source 28, a light emitter 59, a speaker 60, and interfaces 61, 62.

The main controller 51 and the sub-controller 52 each include an independent microcomputer (central processing unit: CPU). The memory 53 is an electrically erasable programmable read-only memory (EEPROM). The memories 54, 55 are each a flash memory (F-ROM). The memories 53, 54 retain in advance a computer program required for operation of the main controller 51, various constants, display data, and the like. The memory 55 retains in advance a computer program required for operation of the sub-controller 52, various constants, display data, and the like.

The light emitter 59 constitutes an element that includes the light emitters 32a, 32b, 32c illustrated in FIG. 8 and the end-face light source 46 illustrated in FIGS. 9 and 10.

The main controller 51 and the sub-controller 52 are connected to each other via a communication line so as to communicate with each other. Thus, the main controller 51 can communicate necessary information with the sub-controller 52 and control the sub-controller 52.

The electric circuit of the meter unit 11 includes a plurality of terminals connected to the main controller 51 via the interface 61. Specifically, a connector 71, a communication input part 72, an input part 73, an output part 74, and a camera input part 75 are connected to the interface 61. Additionally, the electric circuit of the meter unit 11 includes a communication input part 76 and a camera input part 77 connected to the sub-controller 52 via the interface 62.

The connector 71 of the meter unit 11 is connected to the HUD device 16 via a communication line. Thus, the main controller 51 can communicate necessary information with the HUD device 16 and control the HUD device 16.

The communication input part 72 and the communication input part 76 are each connected via a vehicular communication network to various electronic control units (ECUs) that control the vehicle. This enables the main controller 51 and the sub-controller 52 on the meter unit 11 to receive various types of vehicular information from the electronic control units of the vehicle. For example, the main controller 51 and the sub-controller 52 can receive information on the current vehicle speed. The main controller 51 and the sub-controller 52 can further receive a signal that includes position information of the vehicle from a position detecting device such as a global positioning system (GPS) receiver. In addition, the main controller 51 and the sub-controller 52 can receive a signal that includes information on fee collection from an electronic toll collecting system (ETC) vehicle-mounted equipment. Various input devices such as switches and sensors can be connected to the input part 73 of the meter unit 11. Additionally, various output devices can be connected to the output part 74 of the meter unit 11.

An output of a vehicle-mounted camera can be connected to each of the camera input part 75 and the camera input part 77 of the meter unit 11. Specifically, a video signal obtained from imaging by each camera may be input to the meter unit 11 by way of the camera input parts 75, 77.

The main controller 51 performs various types of processing according to the previously installed computer program and, while collecting and communicating various types of data, updates information to be displayed on the screen of the meter left display 36L. The main controller 51 can further control, for example, the lighting of the ambient light source 28, the lighting of the light emitter 59, the output of the speaker 60, the sub-controller 52, and the HUD device 16.

The sub-controller 52 performs various types of processing according to the previously installed computer program and inputs data from the communication input part 76 and the camera input part 77 to update information to be displayed on the screen of the meter right display 36R. In addition, the sub-controller 52 updates information to be displayed on the screen of the meter right display 36R according to an instruction given by the main controller 51.

[Explanation of HUD Device 16]

As illustrated in FIG. 15, the electric circuit of the HUD device 16 includes a controller 81, the liquid crystal display 22g, a memory 83, an electric motor 84, an interface 85, a connector 86, and an input part 87.

The controller 81 includes a microcomputer (CPU). The memory 83 is a flash memory that retains therein in advance a computer program required for the operation of the HUD device 16, various constants, display data, and the like.

The electric motor 84 is a stepping motor connected to the drive mechanism 26 built in the driving unit assembly 24 illustrated in FIG. 7. Specifically, driving the electric motor 84 allows the driving unit subassembly 40 including the combiner 17 to be moved vertically.

The connector 86 and the input part 87 are connected to the controller 81 via the interface 85. The connector 86 is connected to the meter unit 11 via a communication line. Various input devices such as switches and sensors can be connected to the input part 87. For example, an operating switch for directing to start or stop HUD display is connected to the input part 87.

The controller 81 performs various types of processing according to the previously installed computer program and, while collecting and communicating various types of data via the connector 86 or the input part 87, updates information to be displayed on the screen of the liquid crystal display 22g. In addition, the controller 81 drives the electric motor 84 according to the direction to start or stop the HUD display, thereby positioning the combiner 17 at a predetermined display position or stored position.

[Explanation of Main Control Operation]

First Operation Example

Figure 16:
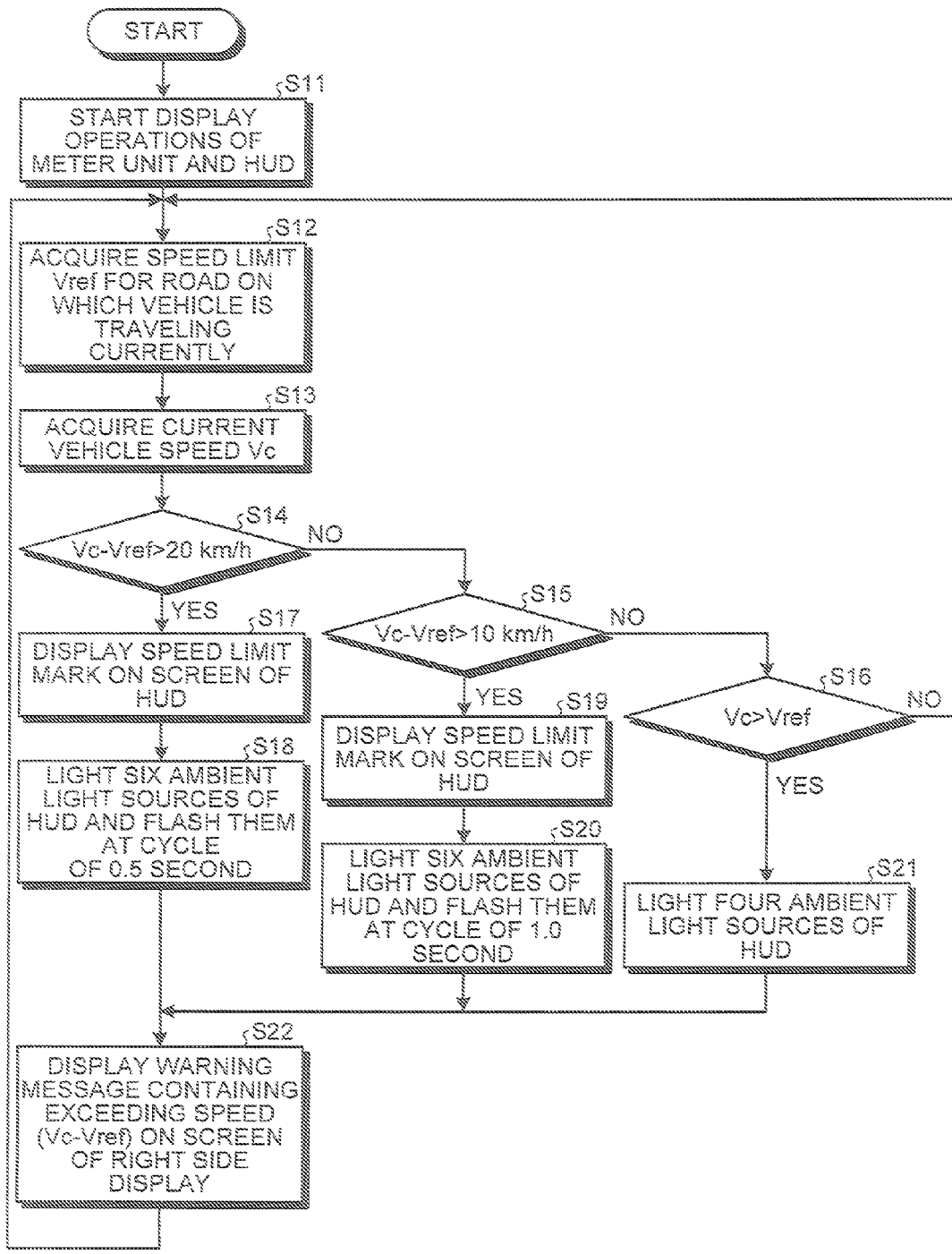
FIG. 16 is a flowchart illustrating a first operation example relating to main control of the display unit.

FIG. 16 illustrates a first operation example relating to main control of the display unit 10. To be more specific, FIG. 16 illustrates display control for informing the driver that the vehicle traveling speed exceeds the speed limit set for the road. FIG. 18 illustrates a specific example of display contents on the HUD display screen that is projected onto the combiner 17 when the vehicle traveling speed exceeds the speed limit set for the road. The outline of the display contents illustrated in FIG. 18 is described first in order to facilitate understanding of operations of the display unit 10.

[Explanation of Exemplary Display]

As illustrated in FIG. 18, a HUD display area 107 (the first display area) and a ambient display area 109 are defined on a display area on the display light reflecting surface 17b of the combiner 17. The HUD display area 107 is a rectangular area for displaying a HUD display content 94B as a display content thereof that is identical to the display content of the liquid crystal display 22g that is projected by the display-light projector 22. As illustrated in FIG. 18, the HUD display area 107 displays "73 km/h" as the vehicle speed meter. Furthermore, the HUD display area 107 displays a speed limit mark 108 as a previously defined warning pattern. The detail of the speed limit mark 108 will be described later. The ambient display area 109 is disposed adjacent on the lower side of the HUD display area 107.

As described above, the six guide lights 111a to 111f as illustrated in FIG. 18 are displayed on the ambient display area 109 by lightening the six light sources 28a to 28f configuring the ambient light source 28 as illustrated in FIG. 11, respectively.

For example, light emitted from the light source 28a is projected onto the combiner 17 via the prism 29a and displayed as the guide light 111a as a virtual image on a central side of the ambient display area 109. Similarly, the light emitted from the light sources 28b to 28f are displayed side by side as the guide lights 111b to 111f as virtual images on the ambient display area 109.

To be more specific, the pair of guide lights 111a and 111b are displayed side by side adjacent to the lower side of the HUD display area 107 with the light emitted from the pair of light sources 28a and 28b. The pair of guide lights 111c and 111d are displayed at the outer sides of the pair of guide lights 111a and 111b with the light emitted from the pair of light sources 28c and 28d, respectively. Furthermore, the pair of guide lights 111e and 111f are displayed at the outer sides of the pair of guide lights 111c and 111d with the light emitted from the pair of light sources 28e and 28f, respectively. In the embodiment, guide lights 111a to 111f are displayed so as to be aligned in the right-left direction. The guide lights 111a and 111b have the largest length in the up-down direction, followed in order by the guide lights 111c and 111d, and 111e and 111f. In the present embodiment, as described earlier, the guide lights 111a and 111b, 111c and 111d, and 111e and 111f are configured so as to have an optical path length from the light source to the eye point increasing in this sequence, so that the guide lights 111a, 111c, and 111e are visually recognized as being posterior in this sequence from the driver.

As illustrated in FIG. 18, the left side display 12 displays thereon the left screen display content 91 as the display content in the normal state illustrated in FIG. 6, and the center display 14 displays thereon the central display content 93. The right side display 13 displays thereon a warning message as the right screen display content 92B. The detail of the warning message will be described later.

[Explanation of Processing Illustrated in FIG. 16]

The processing illustrated in FIG. 16 will be described below. The control for the processing illustrated in FIG. 16 may be performed mainly by the main controller 51 or the sub-controller 52 of the meter unit 11, or by the controller 81 of the HUD device 16. The following description assumes that the main controller 51 mainly performs the control.

For example, when the ignition switch of the vehicle is turned on, that is, when the engine is stated, the processing as illustrated in FIG. 16 is started.

At the first step S11, control by the main controller 51 causes the meter unit 11 and the HUD device 16 to start a display operation. Specifically, the main controller 51 controls the left side display 12, the right side display 13, and the center display 14 into respective display-enabled conditions, and causes the screen of the left side display 12 to display information representing the condition of various components of the vehicle, e.g., the speedometer, the fuel gauge, and the shift position of the transmission. A warning and other contents are displayed mainly on the center display 14. Meanwhile, in the HUD device 16, the electric motor 84 is driven to move the combiner 17 to the use position in which the combiner 17 protrudes upwardly from the instrument panel. In addition, the main controller 51 starts display of the liquid crystal display 22g of the display-light projector 22, and starts to project the display light including the image displayed on the screen of the liquid crystal display 22g onto the combiner 17.

At step S12, the main controller 51 acquires a speed limit Vref for the road on which the vehicle is traveling currently.

An exemplary method of acquiring the speed limit Vref is as follows. The speed limit Vref (for example, 60 km/h) for open roads and the speed limit Vref (for example, 100 km/h) for highways are held in advance as constants on the memory 53. The main controller 51 distinguishes the open roads and the highways based on information from the ETC in-vehicle device that is received through the communication input part 72, and the speed limit Vref for the current road is acquired from the memory 53.

Alternatively, such a method as follows may be employed. That is, information of the current position of the vehicle is acquired using positional information based on a GPS signal received through the communication input part 72. A road corresponding to the current position of the vehicle is then searched using a map database, and the speed limit information for the corresponding road is acquired.

At step S13, the main controller 51 acquires the current vehicle speed Vc from the electric control device of the vehicle.

At step S14, the main controller 51 compares a difference (Vc−Vref) between the current vehicle speed and the speed limit with a predetermined threshold value (in the embodiment, 20 km/h), based on the pieces of information acquired at S12 and S13. When a condition of (Vc−Vref>20 km/h) is satisfied, the process advances to S17. When the condition is not satisfied, the process advances to S15.

At step S15, the main controller 51 compares the difference (Vc−Vref) between the current vehicle speed and the speed limit with a predetermined threshold value (10 km/h), based on the pieces of information acquired at S12 and S13. When a condition of (Vc−Vref>10 km/h) is satisfied, the process advances to S19. When the condition is not satisfied, the process advances to S16.

At step S16, the main controller 51 compares the current vehicle speed with the speed limit, based on the pieces of information acquired at S12 and S13. When a condition of (Vc>Vref) is satisfied, the process advances to S21. When the condition is not satisfied, the process returns to S12.

At step S17, the main controller 51 instructs the HUD device 16 to display the speed limit mark 108 as the predetermined warning pattern on the screen of the liquid crystal display 22g and project the display image to the HUD display area 107 of the combiner 17 by the display-light projector 22 (see FIG. 18). A display pattern similar to the road sign indicating the speed limit can be displayed as the speed limit mark 108, which can allow the driver to grasp the condition easily. The speed limit mark 108 will be displayed as a shaded stereoscopic image unlike the display in the normal state, thereby easily attracting the driver's attention.

At step S18, the main controller 51 informs the driver that the vehicle speed Vc exceeds the speed limit Vref by 20 km/h or more, using the ambient display area 109 of the combiner 17. To be specific, the main controller 51 controls the lighting states of the light sources 28a to 28f of the ambient light source 28 illustrated in FIG. 11 such that all the six guide lights 111a to 111f repeatedly flash at a cycle of 0.5 second.

At step S19, in the same manner as S17, the main controller 51 instructs the HUD device 16 to display the warning pattern of the speed limit mark 108 on the screen of the liquid crystal display 22g and project the display image to the HUD display area 107 of the combiner 17 by the display-light projector 22.

At step S20, the main controller 51 informs the driver that the vehicle speed Vc exceeds the speed limit Vref by 10 km/h or more, using the ambient display area 109 of the combiner 17. To be specific, the main controller 51 controls the lighting states of the light sources 28a to 28f of the ambient light source 28 illustrated in FIG. 11 such that all the six guide lights 111a to 111f repeatedly flash at a cycle of 1.0 second.

At step S21, the main controller 51 informs the driver that the vehicle speed Vc exceeds the speed limit Vref, that is, that the condition of (0 km/h<Vc−Vref<10 km/h) is satisfied, using the ambient display area 109 of the combiner 17. To be specific, the main controller 51 controls the lighting states of the light sources 28a to 28f of the ambient light source 28 illustrated in FIG. 11 such that four of the six guide lights (111a to 111d, or 111c to 111f) light up.

In the embodiment, when the guide lights 111a to 111f for informing the driver of excessive speed are displayed, the main controller 51 controls the light sources 28a to 28f to emit red light. Specifically, of the light emitting diodes emitting red light and green light, only the light emitting diodes emitting red light are energized to emit light. However, the red light emitting diodes and the green light emitting diodes may be alternately energized. The pattern of luminescent color is not limited.

At step S22 subsequent to steps S18, S20, and S21, the main controller 51 causes the right side display 13 to display, as warning display, a warning message containing the value of the speed limit Vref and the excess of speed (Vc−Vref). For example, as illustrated in FIG. 18, a sentence "speed limit is 60 km/h, exceeded by 13 km/h" is displayed. Thereafter, the main controller 51 executes the processing at step S12 again.

Executing the processing as illustrated in FIG. 16 can achieve the display by the display unit 10 as illustrated in FIG. 18. Whether the current vehicle speed Vc exceeds the speed limit Vref and the exceeding degree can be presented by the number of lighting lights of the guide lights 111a to 111f on the ambient display area 109, lighting or flashing, and flashing cycles. That is to say, the lighting states of the guide lights 111a to 111f to be displayed on the combiner 17 with the predetermined positional relation will be changed according to the differential value between the current vehicle speed Vc of the vehicle and the speed limit Vref for the road on which the vehicle is traveling. This enables the driver to grasp the conditions such as the excess of the current vehicle speed Vc over the speed limit Vref by visually recognizing the lighting states of the guide lights 111a to 111f.

Furthermore, the driver can see whether the vehicle speed Vc exceeds the speed limit Vref by visually recognizing the presence and absence of the speed limit mark 108 (warning pattern) in the display image displayed on the combiner 17.

As described above, the imaging positions of the guide lights 111a to 111f displayed as the virtual images by the ambient light source 28 are different from one another in the depth direction (front-rear direction). When the guide lights of which imaging positions are different from one another flash, the driver can visually recognize them as a stereoscopic image with a sense of depth. As a result, a novel mode different from conventional display can be achieved with which the driver can easily grasp the current exceeding condition over the speed limit.

Furthermore, the driver can also grasp the relation between the vehicle speed Vc and the speed limit Vref by visually recognizing the warning message (warning display) on the right side display 13 as the display section of the meter unit 11. Thus, the driver can easily notice the exceeding over the speed limit and can easily grasp the excess.

In the embodiment, the reflecting surface of the combiner 17 is used for performing the HUD display. In place of the combiner 17, for example, part of the front windshield (window) of the vehicle may be used as the reflecting surface of the HUD device.

Second Operation Example

Figure 17:
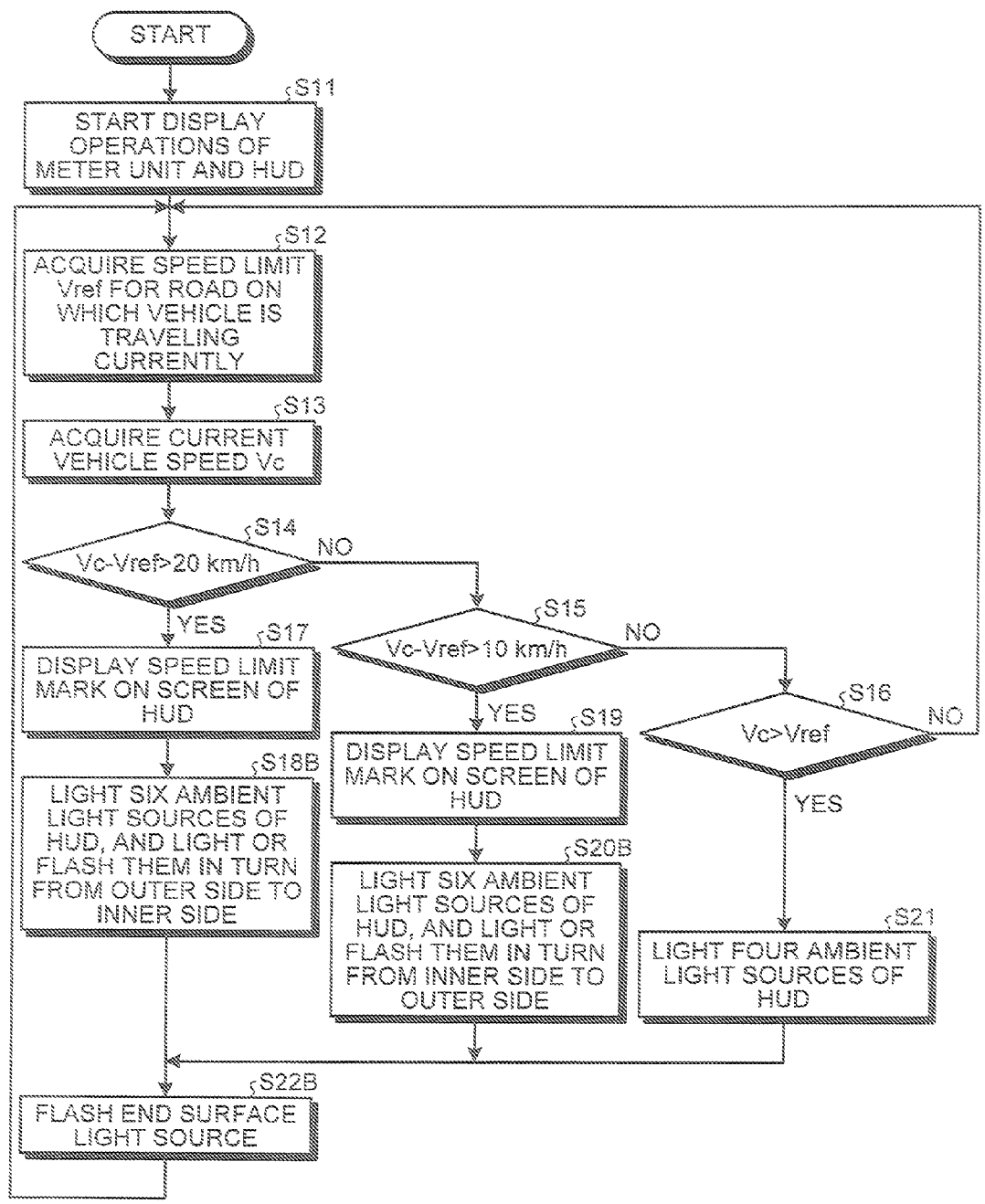
FIG. 17 is a flowchart illustrating a second operation example relating to the main control of the display unit.

FIG. 17 illustrates a second operation example relating to main control of the display unit 10. The control illustrated in FIG. 17 is a variation of the control illustrated in FIG. 16. In FIG. 17, the same reference numerals denote the common steps to those in FIG. 16. The following describes the steps changed in FIG. 17.

At step S18B in FIG. 17, the main controller 51 informs the driver that the vehicle speed Vc exceeds the speed limit Vref by 20 km/h or more, using the ambient display area 109 of the combiner 17. To be specific, the main controller 51 controls the light sources 28a to 28f of the ambient light source 28 illustrated in FIG. 11 such that the six guide lights 111a to 111f illustrated in FIG. 18 light or flash two by two in turn from the outer side to the inner side, that is, the guide lights 111e and 111f, the guide lights 111c and 111d, and the guide lights 111a and 111b light or flash in this order.

At step S20B, the main controller 51 informs the driver that the vehicle speed Vc exceeds the speed limit Vref by 10 km/h or more, using the ambient display area 109 of the combiner 17. To be specific, the main controller 51 controls the light sources 28a to 28f of the ambient light source 28 illustrated in FIG. 11 such that the six guide lights 111a to 111f illustrated in FIG. 18 light or flash two by two in turn from the inner side to the outer side, that is, the guide lights 111a and 111b, the guide lights 111c and 111d, and the guide lights 111e and 111f light or flash in this order.

That is, the control illustrated in FIG. 17 differentiates the direction and order of lighting/flashing of the guide lights 111a to 111f to allow the driver to grasp the exceeding degree of the vehicle speed Vc over the speed limit Vref. In this case, as described above, in the HUD device 16 in the embodiment, the driver can visually recognize the guide lights 111a and 111b, 111c and 111d, and 111e and 111f as if they are located closer to the rear side in this order when viewed from the driver. Thus, when the guide lights 111a to 111f light in turn from the inner side to the outer side in the order of the guide lights 111a and 111b, 111c and 111d, and 111e and 111f, the imaging positions of the guide lights to be visually recognized by the driver are moved from the rear side to the front side. This can cause the driver to visually recognize the direction from the rear side to the front side. When the guide lights 111a to 111f light in turn from the outer side to the inner side, the driver will visually recognize the direction from the front side to the rear side, which is opposite to the above-mentioned direction. As a result, the driver can grasp the exceeding degree of the vehicle speed Vc over the speed limit Vref, based on not only the direction and order of lighting/flashing of the guide lights 111a to 111f on the display surface but also the direction and order of lighting/flashing thereof in the depth direction.

At step S22B, the main controller 51 controls the lighting states of the end face light source 46 to cause the end face light source 46 to flash. The illumination light of the end face light source 46 enters the illumination light entering part 17a of the combiner 17, and the illumination light reflected by the illumination light reflecting part 17c of the end face of the combiner 17 travels toward the driver. Thus, the driver can visually recognize the end face of the combiner 17 illuminated brightly and notice the exceeding of the vehicle speed Vc over the speed limit Vref.

Hereinafter, the HUD device 16 and the display unit 10 according to the embodiment are summarized.

(1) The HUD device 16 in the embodiment is an HUD device mounted on a vehicle. The HUD device 16 includes: the display-light projector 22 (projector) configured to project display light including a display image onto the combiner 17 (reflecting plate); a pair of first light sources (28a, 28b) and a pair of second light sources (28c, 28d) configured to project emitted light onto the combiner 17; and the main controller 51 (controller) connected to the first light sources and the second light sources. The display light from the display-light projector 22 is reflected by the combiner 17 in the viewing direction (eye-point direction) to define the HUD display area 107 (display area) on the combiner 17. The emitted light from the first light sources are reflected by the combiner 17 in the viewing direction to display a pair of first guide lights (111a, 111b) side by side adjacent to the HUD display area 107 on the combiner 17. The emitted light from the second light sources are reflected by the combiner 17 in the viewing direction to display a pair of second guide lights (111c, 111d) at the outer sides of the respective first guide lights on the combiner 17. The main controller 51 controls the lighting states of the first light sources and the second light sources to change at least one of the number of lights to be lit, the lighting cycle, and the lighting order of the first light sources and the second light sources in accordance with the differential value between the current vehicle speed Vc of the vehicle and the speed limit Vref for the road on which the vehicle is traveling currently.

(2) Furthermore, in the HUD device 16 according to the embodiment, when the current vehicle speed Vc of the vehicle exceeds the speed limit Vref, the main controller 51 controls the display-light projector 22 to display the speed limit mark 108 as the predetermined warning pattern relating to the speed limit Vref on the HUD display area 107.

(3) Furthermore, in the HUD device 16 according to the embodiment, the optical path length (D1) from the combiner 17 to the first light sources in the viewing direction differs from the optical path length (D2) from the combiner 17 to the second light sources in the viewing direction.

(4) The display unit 10 according to the embodiment includes the above-mentioned HUD device 16 and the meter unit 11 including two display sections of the left side display 12 and the right side display 13. The main controller 51 causes the display section to display the warning display on the right side display 13 when the above-mentioned differential value exceeds a predetermined threshold value (0 in the above-mentioned embodiment).

The warning message is configured to be displayed on the right side display 13 necessarily when the current vehicle speed Vc of the vehicle exceeds the speed limit Vref in the above-mentioned embodiment. However, the warning message may be displayed only when the difference between the vehicle speed Vc and the speed limit Vref exceeds a predetermined threshold value (20 km/h), for example. Examples of the warning message in this case include a sentence like "the current vehicle speed significantly exceeds the speed limit".

Furthermore, although the warning message is configured to be displayed on the right side display 13 in the above-mentioned embodiment, it may be displayed on the left side display 12 instead of the right side display 13 or in addition to the right side display 13.

In the head-up display device according to one aspect of the present invention, the lighting states of the first guide lights and the second guide lights displayed on the reflecting plate with a particular positional relation are changed in accordance with the differential value between the current traveling speed of the vehicle and the speed limit for the road on which the vehicle is traveling. This enables the driver to grasp a condition of the current traveling speed relative to the speed limit, such as excessive speed, by visually recognizing the lighting states of the first guide lights and the second guide lights. That is to say, the driver will not need to read a numerical value of the current traveling speed from the vehicle speed meter, to grasp the speed limit set for the road on which the vehicle is traveling, or to compare the current traveling speed with the speed limit, in order to grasp the excessive speed condition of the traveling speed. In addition, display is made with the head-up display device, so that the driver can grasp the condition without largely moving his/her sight line from that in a normal driving state. As a result, the head-up display device according to the one aspect can allow the driver to easily grasp the relation between the current traveling speed of the vehicle and the speed limit set for the road on which the vehicle is traveling.

With the head-up display device according to another aspect of the present invention, the driver can see whether the traveling speed exceeds the speed limit by visually recognizing presence and absence of the warning pattern in the display image on the reflecting plate.

In the head-up display device according to still another aspect of the present invention, the optical path lengths of the first light sources and the second light sources are different. Thus, any one of the first guide lights and the second guide lights will be visually recognized at the front side when seen from the driver. With this configuration, the driver can visually recognize the first guide lights and the second guide lights flashing as a stereoscopic image with a sense of depth. As a result, a head-up display device can achieve a novel display mode different from that of the conventional display and can allow the driver to easily grasp the current exceeding condition relative to the speed limit.

Furthermore, when the first guide lights and the second guide lights light in turn, the driver will perceive the forward or backward direction because the imaging positions of the guide lights as viewing targets by the driver are moved in the front-rear direction. As a result, the driver can grasp the exceeding degree of the current vehicle speed over the speed limit with not only the direction and order of lighting/flashing of the guide lights on the reflecting surface (display surface) but also the direction and order of lighting/flashing thereof in the depth direction.

With the head-up display device according to still another aspect of the present invention, the driver can grasp the relation between the traveling speed and the speed limit also by visually recognizing the warning display on the display section of the meter unit.

With the head-up display device and the display unit according to the present invention, the driver can easily grasp the relation between the current traveling speed of the vehicle and the speed limit for the road on which the vehicle is traveling currently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display device mounted on a vehicle, comprising:
   a projector configured to project display light including a display image through a first emitting port onto a reflecting plate directed toward a driver's eye;
   a pair of first light sources and a pair of second light sources configured to project emitted light through a second emitting port onto the reflecting plate, the first light sources and the second light sources are fixed in a respective position relative to the projector; and
   a controller connected to the first light sources and the second light sources, wherein
   the display light from the projector is reflected by the reflecting plate in a viewing direction to define a display area on the reflecting plate,
   the emitted light from the first light sources is reflected by the reflecting plate in the viewing direction to display a pair of first guide lights side by side adjacent to a common side of the display area on the reflecting plate such that the first guide lights remain adjacent to the common side of the display area,
   the emitted light from the second light sources is reflected by the reflecting plate in the viewing direction to display a pair of second guide lights at outer sides of the respective first guide lights and on the common side of the display area on the reflecting plate such that the second guide lights remain adjacent to the common side of the display area and remain fixed relative to the first guide lights,
   the controller controls lighting states of the first light sources and the second light sources to change at least one of a number of light sources to be lit, a lighting cycle, and a lighting order of the first light sources and the second light sources in accordance with a differential value between a current traveling speed of the vehicle and a speed limit set for a road on which the vehicle is traveling, and
   a first pair of prisms positioned in first and second light paths, respectively, of the pair of first light sources, and a second pair of prisms positioned in third and fourth light paths, respectively, of the pair of second light sources.

2. The head-up display device according to claim 1, wherein the projector includes a backlight substrate, a liquid crystal display, and a lens array placed between the backlight substrate and the liquid crystal display.

3. The head-up display device according to claim 1, wherein the first pair of prisms includes first and second reflecting surfaces, respectively, oriented to reflect light incident from the pair of first light sources onto respective first and second locations of the reflecting plate, the second pair of prisms includes third and fourth reflecting surfaces, respectively, oriented to reflect light incident from the pair of second light sources onto respective third and fourth locations of the reflecting plate, and the third and fourth locations are spaced from the first and second locations.

4. The head-up display device according to claim 1, further comprising an end face light source adjacent the reflecting plate.

5. The head-up display device according to claim 1, wherein
when the current traveling speed of the vehicle exceeds the speed limit, the controller controls the projector to display a predetermined warning pattern relating to the speed limit on the display area.

6. The head-up display device according to claim 5, wherein
an optical path length from the reflecting plate to the first light sources in the viewing direction differs from an optical path length from the reflecting plate to the second light sources in the viewing direction.

7. A display unit comprising:
the head-up display device according to claim 5; and
a meter unit including a display section, wherein
the controller causes the display section to display a warning display when the differential value exceeds a predetermined threshold value.

8. The head-up display device according to claim 1, wherein
an optical path length from the reflecting plate to the first light sources in the viewing direction differs from an optical path length from the reflecting plate to the second light sources in the viewing direction.

9. A display unit comprising:
the head-up display device according to claim 8; and
a meter unit including a display section, wherein
the controller causes the display section to display a warning display when the differential value exceeds a predetermined threshold value.

10. A display unit comprising:
the head-up display device according to claim 1; and
a meter unit including a display section, wherein
the controller causes the display section to display a warning display when the differential value exceeds a predetermined threshold value.

11. The display unit device according to claim 10, further comprising a driving unit assembly connected to the reflecting plate, and the driving unit assembly is configured to move the reflecting plate between a use position and a stored position.

* * * * *